United States Patent [19]
Deryugin et al.

[11] Patent Number: 5,926,538
[45] Date of Patent: Jul. 20, 1999

[54] METHOD FOR ROUTING CALLS TO CALL CENTERS BASED ON STATISTICAL MODELING OF CALL BEHAVIOR

[75] Inventors: Vladimir N. Deryugin, San Mateo; Dimitriy A. Torba, San Bruno; Igor Neyman, Palo Alto, all of Calif.

[73] Assignee: Genesys Telecommunications Labs, Inc, San Francisco, Calif.

[21] Appl. No.: 08/798,236

[22] Filed: Feb. 11, 1997

[51] Int. Cl.[6] ............................ H04M 3/00; H04M 7/00
[52] U.S. Cl. .................... 379/265; 379/220; 379/230; 379/309
[58] Field of Search .................... 379/210, 214, 379/265, 266, 309, 230, 207, 219, 220, 225

[56] References Cited

U.S. PATENT DOCUMENTS

| | | | |
|---|---|---|---|
| 4,290,141 | 9/1981 | Anderson et al. | 455/2 |
| 4,320,256 | 3/1982 | Freeman | 179/6.04 |
| 4,345,315 | 8/1982 | Cadotte et al. | 364/900 |
| 4,355,207 | 10/1982 | Curtin | 179/18 |
| 4,355,372 | 10/1982 | Johnson et al. | 364/900 |
| 4,439,636 | 3/1984 | Newkirk et al. | 179/7.1 |
| 4,451,700 | 5/1984 | Kempner et al. | 179/2 |
| 4,489,438 | 12/1984 | Hughes | 381/51 |
| 4,517,410 | 5/1985 | Williams et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |
| 4,539,435 | 9/1985 | Eckmann et al. | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Levy et al. | 179/99 |
| 4,578,700 | 3/1986 | Roberts | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | DeFrancesco et al. | 364/408 |
| 4,603,232 | 7/1986 | Kurland et al. | 179/2 |
| 4,611,094 | 9/1986 | Asmuth et al. | 179/7.1 |
| 4,625,276 | 11/1986 | Benton et al. | 364/408 |
| 4,630,200 | 12/1986 | Ohmae et al. | 364/405 |
| 4,630,201 | 12/1986 | White | 364/408 |
| 4,634,809 | 1/1987 | Paulsson et al. | 379/91 |
| 4,649,563 | 3/1987 | Reskin | 379/97 |
| 4,654,482 | 3/1987 | DeAngelis | 379/95 |
| 4,667,287 | 5/1987 | Allen et al. | 364/200 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,737,983 | 4/1988 | Frauenthal et al. | 379/265 X |

(List continued on next page.)

OTHER PUBLICATIONS

Margie Semilof "Call Centers Go On-Line" Communications Week, No Date Available.

*Primary Examiner*—Harry S. Hong
*Attorney, Agent, or Firm*—Donald R. Boys

[57] ABSTRACT

A system for routing calls has a plurality of call centers and a central controller for managing activity of the plurality of call centers, including call loading. The central controller utilizes a method for managing loading based on estimates of loading for call centers in the system for which real time loading information is not available during certain time intervals. The method involves retrieving a previous status of the call center for which real time information is not available, and using that previous status to perform and estimate of current loading for management purposes.

10 Claims, 3 Drawing Sheets

U.S. PATENT DOCUMENTS

| | | | |
|---|---|---|---|
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Furguson et al. | 235/383 |
| 5,261,096 | 11/1993 | Howarth | 365/650 |
| 5,278,977 | 1/1994 | Spencer et al. | 395/575 |
| 5,280,625 | 1/1994 | Howarter et al. | 395/200 |
| 5,343,477 | 8/1994 | Yamada | 371/8.2 |
| 5,392,400 | 2/1995 | Berkowitz et al. | 395/200 |
| 5,444,774 | 8/1995 | Friedes | 379/266 |
| 5,455,903 | 10/1995 | Jollissaint et al. | 395/155 |
| 5,528,678 | 6/1996 | Kaplan | 379/201 |
| 5,530,744 | 6/1996 | Charlambous et al. | 379/265 |

METHOD FOR ROUTING CALLS TO CALL CENTERS BASED ON STATISTICAL MODELING OF CALL BEHAVIOR

FIELD OF THE INVENTION

This invention relates to telephone communications, and particularly to methods and systems for centrally managing a plurality of call centers.

BACKGROUND OF THE INVENTION

The telephone is one of the most widely used communication equipments in the world. At first, it was merely a convenient tool to allow people to communicate while they are physically separated. Recently, many companies use telephones to market products and services, provide technical supports to consumer products, allow callers to access their own financial data, etc. Thus, the telephone is becoming a major business and marketing tool.

In order to more effectively use telephone for business and marketing purposes, call centers have been developed. In a call center, a large number of agents handle telephone communication with callers. The matching of calls between callers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the caller who has been assigned that phone number. The software can now route the call to an agent who can best handle the call based on predefined criteria (e.g., language skill, knowledge of products the caller bought, etc.). The software immediately transfers relevant information to a computer screen used by the agent. Thus, the agent can gain valuable information about the caller prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In a prior art call center architecture, each call center is an independent unit. Current development in call center technology allows the linking of multiple call centers. In this architecture, a centralized controller is used to manage these call centers. This central controller contains information on the activities and resources of each of these call centers. It is found that this architecture allows more efficient use of call center resources. As an example, a first call center may be overloaded during the morning and a second call center overloaded in the afternoon. The central controller monitors the loading at each call center and routes the calls to the appropriate call centers. Thus, in the above example, more calls will be routed to the second call center during the morning (and converse during the afternoon) so as to equalize the loads. As a result, the performance of this architecture is better than the architecture in which all the call centers are independent.

In order for the multiple call center architecture to work, the central controller needs to have information on the activities of all the call centers. There are at least two cases in which this information may not be readily available. In the first case, activity information for each call center is sent to the central controller only at certain time instances. As a result, there are time intervals in which real-time activity information is not available. Consequently, it is desirable to be able to develop a method to estimate the behavior of the call centers during these intervals. In the second case, there are times when the connection between one or more call centers and the central controller is broken. Thus, this call center cannot send activity information to the central controller. A conventional central controller would not be able to route calls to these disconnected call centers. As a result, the performance could suffer major degradation. Consequently, there is a need to develop a system and method that can reduce the performance degradation.

SUMMARY OF THE INVENTION

The present invention allows the central controller to use statistical technique to model the behavior of a call center during the time interval when actual status data of the call center is not available. It is observed that the telephone traffic pattern of many call centers can be predicted using statistical tools. One aspect of the present invention involves a model for estimating the ability of a call center to handle new calls. This model is based on historic data. Consequently, the central controller can continue to route call using statistical estimation of the call behavior.

A call center is prevented from sending status data to the central controller due to many reasons. For example, the call center may be allowed to send status data to the central controller only during preassigned times. Another reason is when connection between the call center and the central controller is broken.

The present invention involves a method for routing a telephone call arriving at a system having a plurality of call centers controlled by a central controller. Each of the plurality of call centers periodically sends current status information to the central controller. At least one of the call centers is temporarily unable to send the current status information to the central controller (e.g., for the above stated reasons). The central controller retrieves the status information of this particular call center that has been previously sent thereto. The status of this call center is estimated based on the retrieved status information. The center controller then routes the call to one of the plurality of call centers using the estimated status of this one call center and the status information of other call centers.

These and other features of the present invention will become apparent from the following description when read in conjunction with the accompanying drawings.

DETAILED DESCRIPTION OF THE INVENTION

Figure 1:
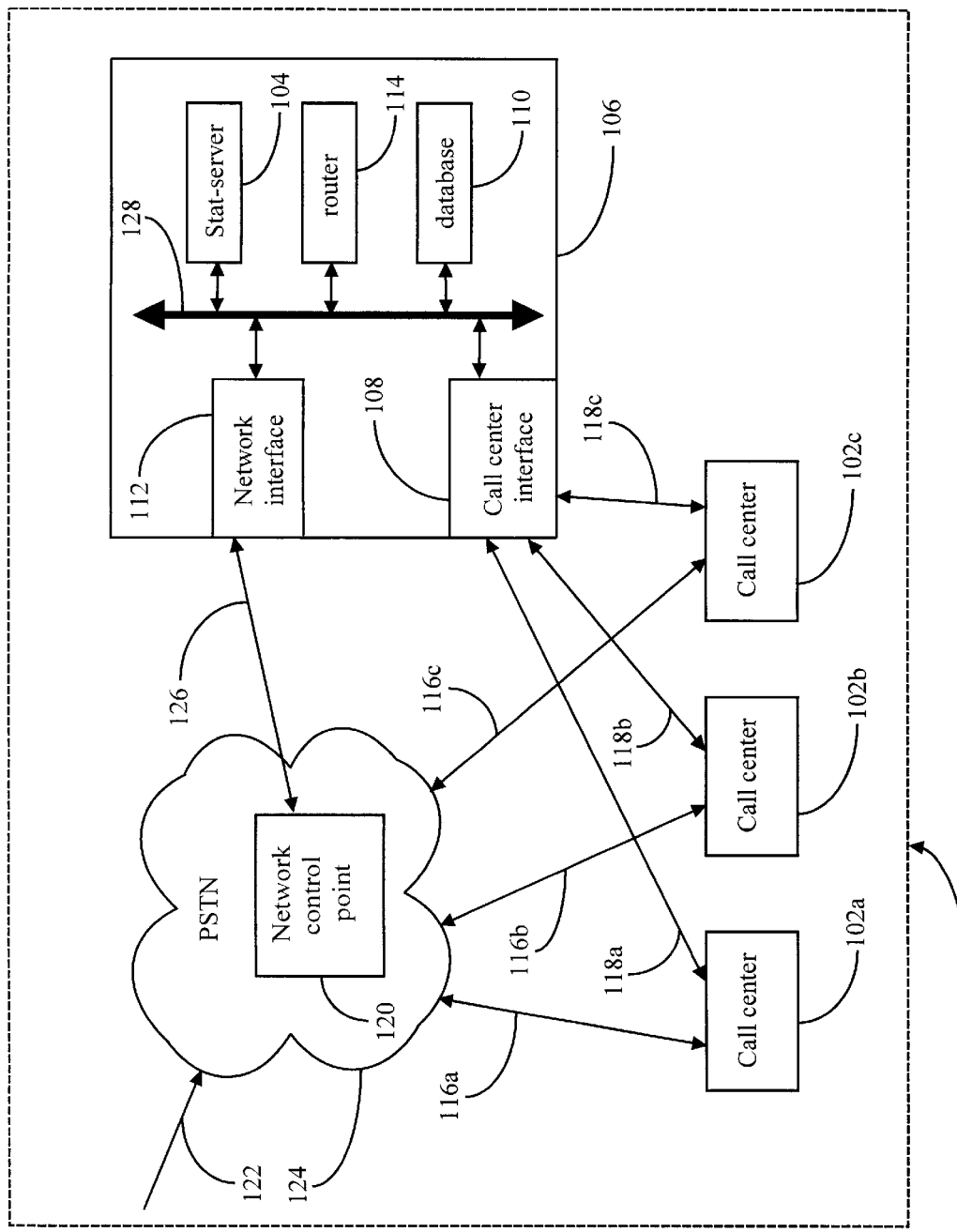
FIG. 1 is a schematic diagram of a call center system containing a central controller of the present invention.

FIG. 1 is a schematic diagram of a call center system 100 of the present invention having a plurality of call centers (such as call center 102a, 102b and 102c) and a central controller 106. Controller 106 contains a call center interface unit 108 for communicating with call centers 102a, 102b and 102c, a stat-server 104 for containing statistical information of all the call centers, a database 110 for storing agent and customer information, and a router 114 for routing calls to individual call centers in accordance with a routing algorithm. These components are connected to each other via a data bus 128. Call center interface unit 108 is connected to call centers 102a, 102b and 102c using communication links 118a, 118b and 118c.

When a caller dials a telephone number that is preassigned to call center system 100, the call (shown as line 122 in FIG. 1) is temporarily parked at a network control point 120 in the public switched telephone network (PSTN) 124. Network control point 120 has the ability to route call 122 to any one of the call centers 102a, 102b and 102c. Upon identifying that the called telephone number is controlled by central controller 106, network control point 120 notifies central controller 106 (through a network interface 112) of the arrival of the incoming call via a communication link 126. Router 114 of central controller 106 determines the optimal routing of call 122 using information in stat-server 104 and database 110. The routing decision is sent to network control point 120. Call centers 102a, 102b and 102c are connected to PSTN 124 through telephone lines 116a, 116b, and 116c, respectively. As a result, call 122 is routed to the appropriate call center.

It should be noted that the geographic location of central controller is not important for the present invention. Thus, central controller could be located inside or outside of PSTN 124. It could also be located inside the premise of one of the call centers.

Figure 2:
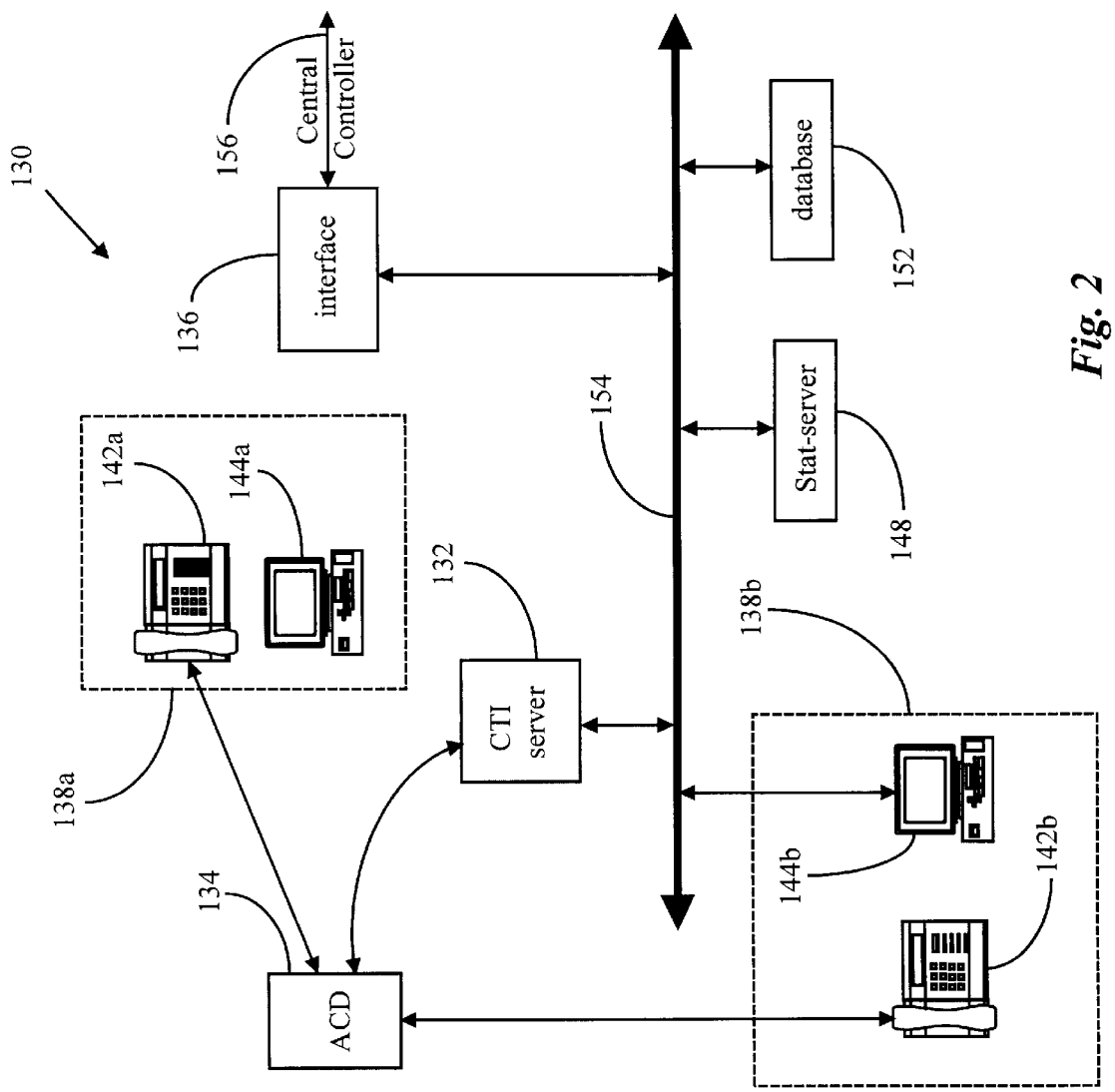
FIG. 2 is a schematic diagram of an individual call center of the present invention.

The structure of call centers 102a, 102b and 102c are essentially the same. Consequently, only one of the call centers is described in detail here. FIG. 2 is a block diagram of such a call center 130. It contains an interface unit 136 for communicating with central controller 106. It also contains a CTI server 132 which is connected to an automatic call distributor (ACD) 134. It should be noted that a switch or private branch exchange (PBX) may be used. ACD 134 could also be a switch. A number of agent stations (such as stations 138a and 138b) are located in call center 130. Each agent station typically contains a telephone (such as 142a and 142b) and a computer (such as computer 144a and 144b). The telephones are connected to ACD 134 and the computers are connected to a data bus 154.

After central controller 106 determines that a call should be routed to call center 130, network control point 120 forwards call 122 to ACD 134 (or a switch or PBX). If a switch is used, the call could be routed to a routing point in the switch wherein routing is controlled by external software. At the same time, central controller 106 instructs CTI server 132 to route call 122 to a selected agent station (such as 138a). Central controller 106 may also supply customer information to computer 144a. Alternatively, call center 130 may optionally contain a stat-server 148, a database 152 and a router (not shown). In this case, routing inside call center 130 is performed locally. CTI server 132, interface 136, stat-server 148 and database 152 communicate with each other through bus 132. Call center 130 contains a number of hardware queues (e.g., ACD queues) and/or software queues maintained by the software in call center 130.

Call center system 100 will work optimally when central controller 106 contains a complete set of information on all telephone traffic in system 100. However, it is possible that the communication link between one or more call centers and central controller 106 be broken for a brief duration. In a conventional system, central controller 106 will no longer route calls to these detached call centers. One aspect of the present invention is the realization that the telephone traffic behavior of a call center can be statistically estimated using historic data. As a result, it is possible for central controller 106 to determine whether the detached call centers are busy. If it is determined that the detached call centers are not busy, central controller 106 continues to instruct network control point 120 to route calls to these detached call centers.

One function of interface unit 136 is to update central controller 106 of the status of call center 130, such as the number of agents who have left the call center, the status of each agent, etc. This information is stored in stat-server 104 of central controller 106. If communication link 156 between call center 130 and central controller 106 becomes broken, central controller 106 can use the status information to determine whether calls should be routed to call center 130. Even if the link is not broken, it is preferred to estimate the status, as explained below in connection with FIG. 3.

Figure 3:
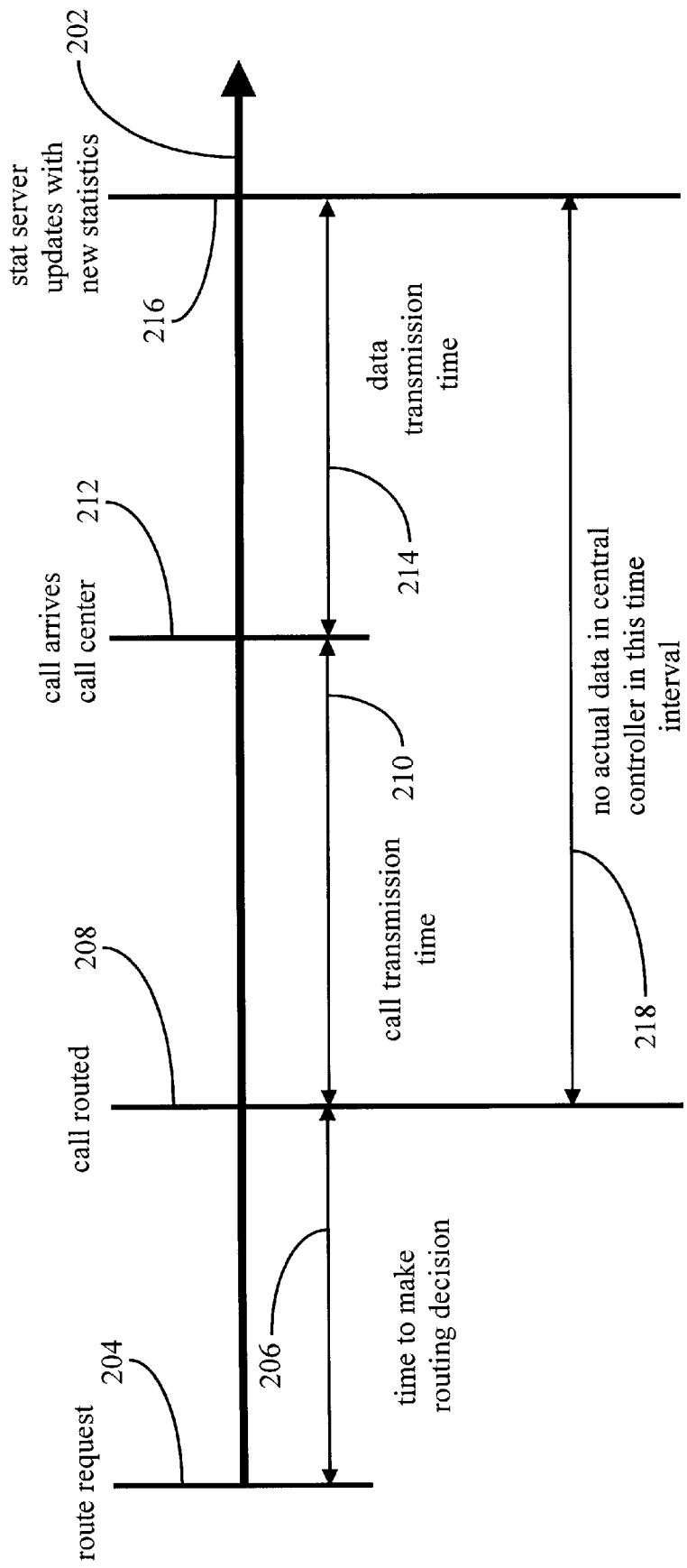
FIG. 3 is a timing diagram showing a time interval when the estimation algorithm in accordance with the present invention is needed because no actual data is available.

FIG. 3 shows a time line 202 running in a horizontal direction. At a time indicated by a line 204, a route request is generated because a new call has just arrived. A time interval indicated by a line 206 is required to make a routing decision. The call is routed at a time indicated by a line 208. It takes a time interval 210 for the call to be transmitted to a destination call center. At a time indicated by a line 212, the call arrives at the destination call center. The stat-server within the central controller needs a time interval (shown by a line 214) to receive new statistical data because it takes time to pass information from the destination call center to the stat-server. At a time indicated by a line 216, the stat-server is updated. It can be seen from FIG. 3 that no actual data is available at the central controller for a time interval indicated by a line 218. The estimation algorithm of the present invention can be used to facilitate routing during this time interval.

There are many ways to estimate telephone traffic in a call center. An exemplary algorithm for such purpose is described below. The symbols used in the algorithm are defined first.

| | |
|---|---|
| UT | The time of the last update from the detached call center; |
| A | The total number of agents in the detached call center; |
| AA | The number of available agents in the detached call center; |
| CQ | The number of calls in the queue of the detached call center; |
| AHT | The average call handling time in the detached call center |
| CA | The number of answered calls in the detached call center; |
| CC | The number of completed calls in the detached call center; |
| AC | The number of agents on call in the detached call center; |
| AW | The number of agents in after-call work in the detached call center; |
| AAW | The number of agents in auxiliary work in the detached call center; |
| OC | The time of the oldest call in the queue of the detached call center; |
| CADD | A container for adding new calls; |
| T | The current time (i.e., time when a routing decision is made); and |
| BA | The number of busy agents in the detached call center. |

The algorithm is:

```
if ((T-UT)*min(CQ+AC+AW,A-AAW)/AHT>CQ+AC+AW){
   BA=0;
   CC=CC+CQ+AC+AW;
   CQ=0; }
else if (CQ+AC+AW-(T-UT)*min(CQ+AC+
       AW,A-AAW)/AHT<A-AAW){
   BA=CQ+AC+AW-(T-UT)*min(CQ+AC+AW,A-AAW)/AHT;
   CC=CC+(T-UT)*min(CQ+AC+AW,A-AAW)/AHT;
```

-continued

```
  CQ=0; }
else {
  BA=A-AAW;
  CC=CC+(T-UT)*min(CQ+AC+AW,A-AAW)/AHT;
  CQ=max(0,CQ+AC+AW-(T-UT)*min(CQ+AC+
    AW,A-AAW)/AHT-A+AAW);
  }
CA=CC+BA;
AC=min(BA,max(0,BA*CD/AHT));
AW=BA-AC;
AA=A-AAW-BA;
UT=T.
```

In the above algorithm, the term (AC+AW) corresponds to the number of agents that are currently devoted to call-processing activity. The term CQ corresponds to the number of calls that are waiting to be processed because these calls are in the queue. Assuming that one agent handles one call at a time, this term (CQ+AC+AW) could be interpreted as (a) the number of agents needed to process calls already in the call center and (b) the number of calls that are currently being processed or need to be processed. The term (A-AAW) corresponds to the number of agents that are not in auxiliary work, and are thus presumably devoted to call processing activities. The term (T-UT) is the time interval from the last update time to the current time. Consequently, (T-UT)/AHT corresponds to the number of calls that can be handled by each agent in the call center during this time period. Thus, the term (T-UT)* min(CQ+AC+AW,A-AAW)/AHT corresponds to probable number of calls being processed or need to be processed. As a result, the term under the "if" clause corresponds to the case where all incoming calls have been processed in time interval (T-UT). That is, the load is very light relative to the capability of this call center. Consequently, the number of busy agents and the number of calls in the queue are equal to zero.

The term under the "else if" clause is invoked when not all calls have been processed. However, the approximate number of unprocessed calls is less than the number of available agents. If this condition occurs, some of the agents are currently answering calls. However, there is no unanswered calls that need to be placed in the queue because there are agents available to answer the call.

When neither the conditions in the "if" or the "else if" clause are met, some calls will be placed in the queue because all available agents are busy in answering calls.

Using the above statistical model, central controller 106 can determine the capability of the detached call center to process new calls. Other information may also be needed in determining where to route a call. One piece of information is the time when the oldest call in the queue arrive ("OC"). For example, a routing strategy may not route calls to a call center where the calls in its queue has a long OC. This parameter can be estimated statistically. As an example, central controller 106 may contains a plurality of containers ("CADD"), one for each call center, for recording the time of arrival of all calls processed or to be processed by the call centers. The CADD is an internal queue, created and updated by central controller 106 for use by this statistical modeling. One way to determine OC is to trace back from the newest call in the CADD a number of calls equal to CQ (i.e., the number of calls in the queue). Because CQ can be determined from the above statistical model, OC can also be determined from this statistical model.

Based on the above algorithm, it is possible to predict how many calls a call center can accept. Consequently, central controller 106 may route calls to a call center even when no instantaneous data related to the call center is available.

The above statistical model can be used in the case where status data of each call centers can only be sent to central controller 106 at pre-assigned times. In this case, this statistical model is used to estimate call behavior between the times status data is sent.

The invention has been described with reference to specific exemplary embodiments thereof. Various modification and changes may be made thereunto without departing from the broad spirit and scope of the invention. For example, the starting values of the parameters used in the estimation algorithm could be specified explicitly or obtain from a set of historic data. Further, these two sets of starting values could be switch at will by a user of the present invention. The specification and drawings are, accordingly, to be regarded in an illustrative rather than a restrictive sense; the invention is limited only by the provided claims.

We claim:

1. A system for routing telephone calls to individual ones of a plurality of call centers, said system comprising:
 call switching apparatus at the call centers for switching calls to agent stations; and
 a plurality of computer telephony integration (CTI) servers, with individual ones of the CTI servers monitoring call activity at individual ones of the plurality of call centers;

wherein the CTI servers continuously report the status of activity at monitored call centers to a central controller on a per-transaction basis, and wherein the central controller estimates status of said call centers when CTI servers are unable to provide continuous status, and routes calls to said call centers based on said estimations.

2. The system of claim 1 wherein CTI servers monitor activity at the call centers through automatic call distributors (ACDs) associated with the switching apparatus at the call centers.

3. The system of claim 1 wherein the CTI servers monitor activity the call centers through telephony switches or private branch exchanges (PBXs) at the call centers.

4. The system of claim 1 wherein interruption of continuous monitoring of activity by a CTI server is due to a break in a communication link between the CTI server and the central controller.

5. The system of claim 1 wherein the said estimations are based upon previously reported status.

6. A method for routing telephone calls to individual ones of a plurality of call centers, said method comprising steps of:

a) monitoring call activity at a plurality of call centers by CTI servers connected to switching apparatus at the call centers, wherein individual ones of the CTI servers continuously report the status of call centers to a central controller on a per-transaction basis;

b) in the event a CTI server is unable to continuously report status of a call center to the central controller, estimating, by the central controller, the activity of the effected call center based on past reported activity of the effected call center;

c) routing, by the central controller, calls to effected call center based on said estimations.

7. The method of claim 6 wherein the CTI servers monitor the call centers through an automatic call distributor (ACD).

8. The method of claim 6 wherein the CTI servers monitor the call centers through telephony switches or private branch exchanges (PBXs).

9. The method of claim 6 wherein interruption in continuous reporting by said CTI server is due to a break in a communication link between the CTI server and the central controller.

10. The method of claim 6 wherein said estimations are based upon previously reported status.

* * * * *